US012596797B2

(12) United States Patent
Rodriguez Bravo et al.

(10) Patent No.: US 12,596,797 B2
(45) Date of Patent: Apr. 7, 2026

(54) IDENTIFY POTENTIAL PATTERNS OF COMPROMISE ON LOG FILES

(71) Applicant: Kyndryl, Inc., New York, NY (US)

(72) Inventors: Cesar Augusto Rodriguez Bravo, Heredia (CR); Daniel S. Riley, Wake Forest, NC (US)

(73) Assignee: Kyndryl, Inc., New York, NY (US)

( * ) Notice: Subject to any disclaimer, the term of this patent is extended or adjusted under 35 U.S.C. 154(b) by 267 days.

(21) Appl. No.: 18/504,732

(22) Filed: Nov. 8, 2023

(65) Prior Publication Data

US 2025/0148075 A1 May 8, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | |
|---|---|---|---|
| 9,386,034 B2 | 7/2016 | Cochenour | |
| 10,462,170 B1 | 10/2019 | Wang | |
| 10,805,316 B2 | 10/2020 | Aditham | |
| 2012/0030767 A1* | 2/2012 | Rippert, Jr. ............ | G06Q 10/10 |
| | | | 726/25 |

| | | | |
|---|---|---|---|
| 2018/0062909 A1 | 3/2018 | Upshur | |
| 2020/0159926 A1 | 5/2020 | Lorch | |
| 2022/0329616 A1 | 10/2022 | O'Hearn | |
| 2023/0164567 A1* | 5/2023 | Fellows .............. | H04L 63/1425 |
| | | | 455/410 |
| 2024/0187449 A1* | 6/2024 | Onut ................... | H04L 63/1483 |

FOREIGN PATENT DOCUMENTS

| | | | | |
|---|---|---|---|---|
| CN | 111404909 B | 5/2022 | | |
| CN | 115102848 A | * 9/2022 | ........... | H04L 41/069 |
| CN | 116471083 A | * 7/2023 | ......... | H04L 63/1425 |

OTHER PUBLICATIONS

Yiwei Hou; An Empirical Study of Data Disruption by Ransomware Attacks; 2024 IEEE/ACM 46th International Conference on Software Engineering (ICSE) (2024, pp. 1984-1995); (Year: 2024).*

(Continued)

*Primary Examiner* — Luu T Pham
*Assistant Examiner* — Chao Wang
(74) *Attorney, Agent, or Firm* — CANTOR COLBURN LLP; Erik Swanson

(57) ABSTRACT

This disclosure presents an approach for identifying obfuscation patterns within system log files to enhance cybersecurity. The method involves two key stages: first, detecting tampering in a primary set of log entries; and second, monitoring a secondary set of log files for the presence of these tampering patterns. By comparing the identified obfuscation patterns in the primary log entries with those detected in the secondary set, the system can effectively identify potential system intrusions. This innovative approach provides an advanced and proactive means of bolstering system security by uncovering and responding to malicious activities that attempt to obscure their tracks within log files, ultimately enhancing the defense against cyber threats.

12 Claims, 6 Drawing Sheets

(56)  References Cited

OTHER PUBLICATIONS

Teng Li; DeepAG: Attack Graph Construction and Threats Prediction With Bi-Directional Deep Learning; IEEE Transactions on Dependable and Secure Computing (vol. 20, Issue: 1, 2023, pp. 740-757); (Year: 2022).*

Jack W. Stokes; MART: Targeted attack detection on a compromised network; MILCOM 2016—2016 IEEE Military Communications Conference (2016, pp. 988-997); (Year: 2016).*

Fox, "Hackers can be undetected for 210 days, expert says," CNBC, Jun. 2014, 3 pages.

Palmer, "Hackers are now hiding inside networks for longer. That's not a good sign," ZDNET, Jun. 2022, 4 pages.

Spivey, "Hackers Wait Up to Six Months After Access to Trigger Ransomware," Cybersecurity, Wingswept, Jul. 2020, 2 pages.

* cited by examiner

100

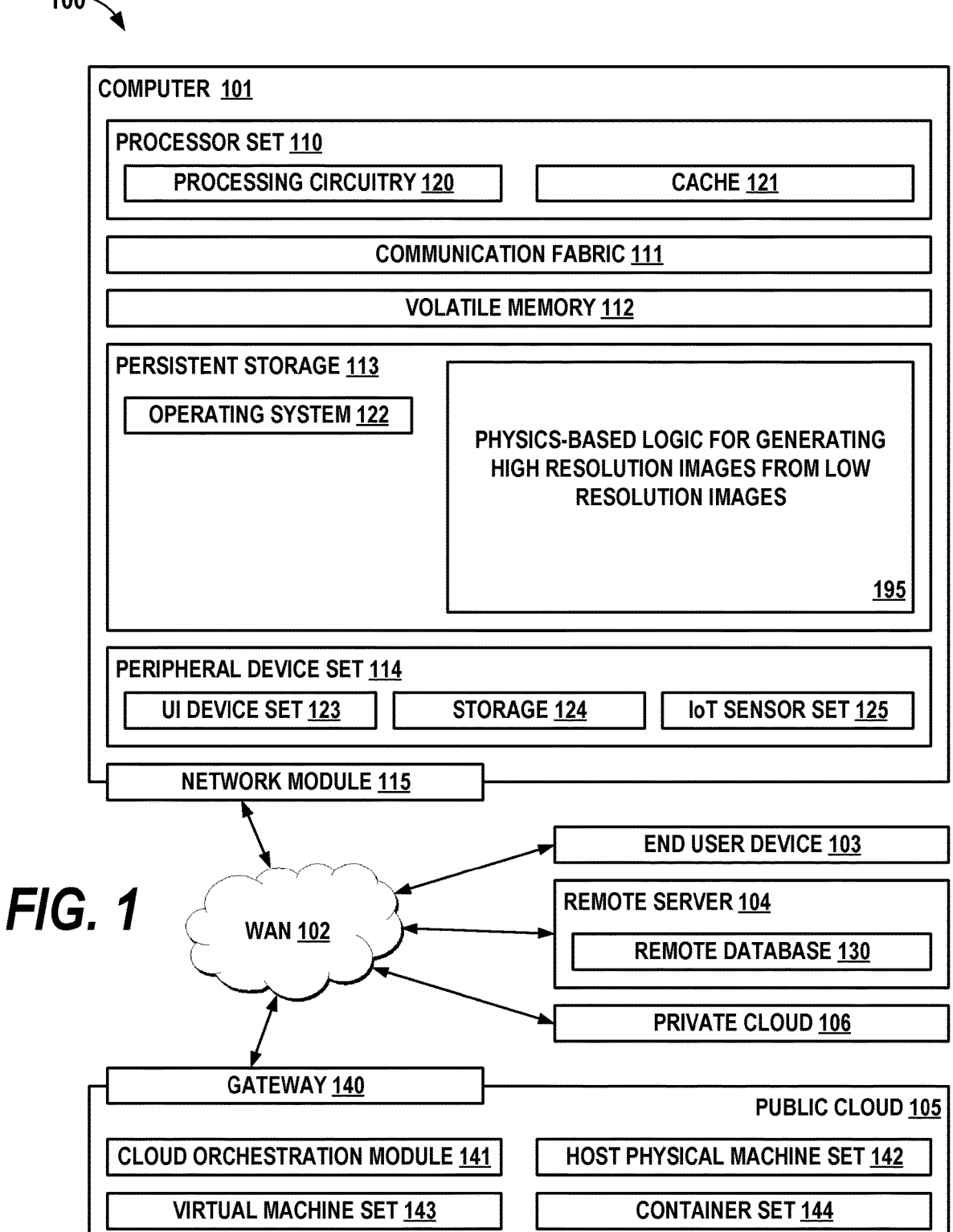

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

PHYSICS-BASED LOGIC FOR GENERATING HIGH RESOLUTION IMAGES FROM LOW RESOLUTION IMAGES

195

PERIPHERAL DEVICE SET 114

UI DEVICE SET 123     STORAGE 124     IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

IDENTIFY POTENTIAL PATTERNS OF COMPROMISE ON LOG FILES

BACKGROUND

Hackers who manipulate log files during system intrusions possess a deep understanding of cybersecurity and exploit vulnerabilities in their target systems. They often have advanced technical skills, including knowledge of various operating systems, networking protocols, and programming languages. These hackers employ various techniques to alter or delete log entries, making it challenging for system administrators to detect their malicious activities. Their motive typically includes covering their tracks, evading detection, and maintaining access for extended periods. This sophisticated approach underscores the need for robust security measures, including real-time monitoring, intrusion detection systems, and strong access controls to counteract their efforts and protect against cyber threats.

SUMMARY

This disclosure presents an approach for identifying obfuscation patterns within system log files to enhance cybersecurity. The method involves two key stages: first, detecting tampering in a primary set of log entries; and second, monitoring a secondary set of log files for the presence of these tampering patterns. By comparing the identified obfuscation patterns in the primary log entries with those detected in the secondary set, the system can effectively identify potential system intrusions. This innovative approach provides an advanced and proactive means of bolstering system security by uncovering and responding to malicious activities that attempt to obscure their tracks within log files, ultimately enhancing the defense against cyber threats.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 1 is a block diagram of a data processing system in which the methods described herein can be implemented;

DETAILED DESCRIPTION

Figure 2:
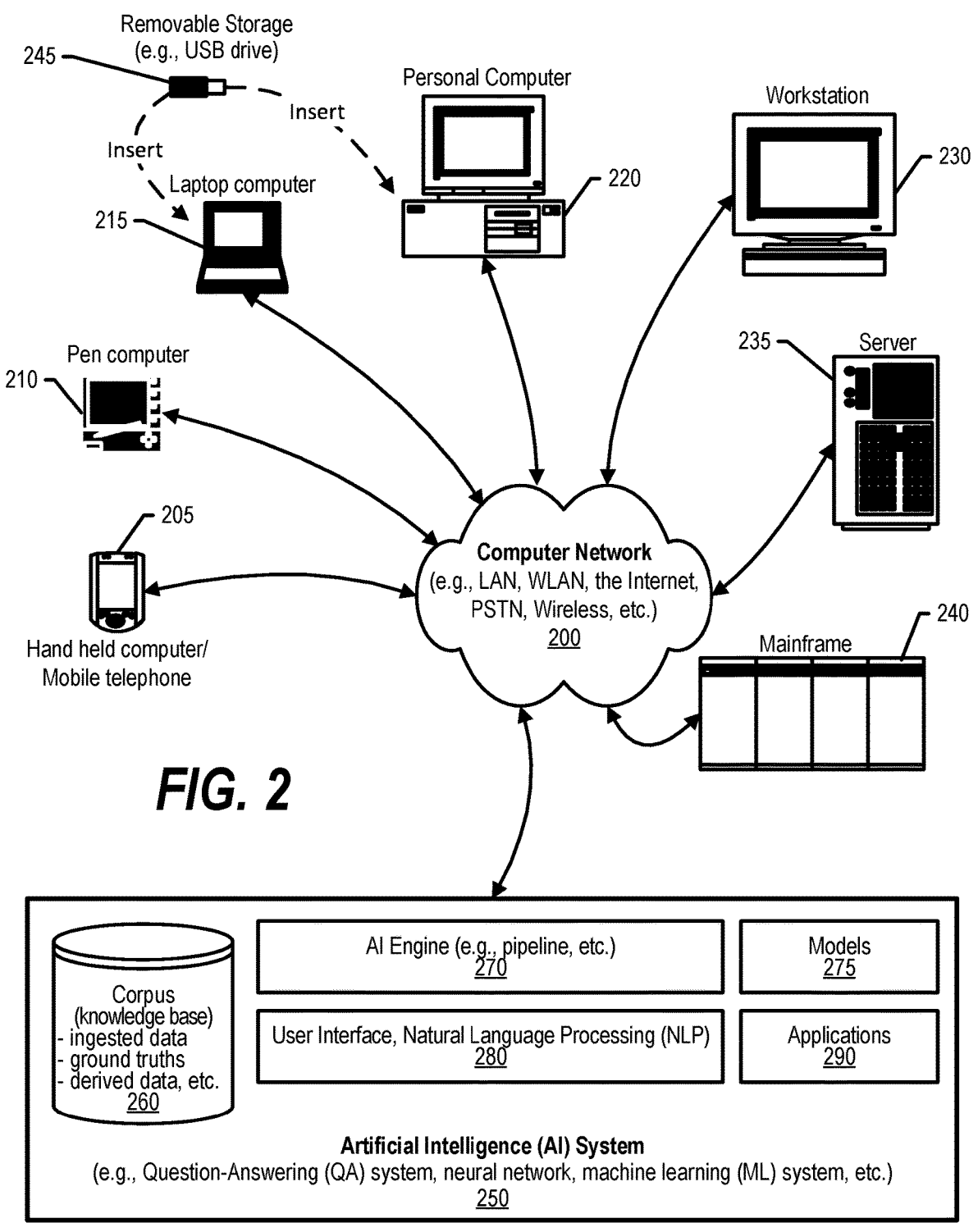
FIG. 2 provides an extension of the information handling system environment shown in FIG. 1 to illustrate that the methods described herein can be performed on a wide variety of information handling systems which operate in a networked environment.

FIGS. 1-6 describe an approach that identifies potential patterns of compromise using system log files. The proposed system represents a solution for identifying patterns linked to log file tampering, which can be subsequently leveraged to enhance the real-time detection of intrusions, including the notoriously elusive Advanced Persistent Threats (APTs). This innovative approach comprises several key components and pioneering aspects:

Data Collection: The system's foundation involves the collection of two distinct types of log data. The first category comprises "Tampered logs," representing log files that have been maliciously altered by attackers. The second category consists of "Untampered logs," serving as the baseline of normal system activity.

TF*IDF Algorithm: The system employs the well-established TF*IDF (term frequency-inverse document frequency) algorithm, which is not novel itself, to process both sets of log data separately. This analysis results in the creation of two distinctive clusters of patterns: "Cluster nz" derived from tampered logs and "Cluster nx" from untampered logs.

Delta Discovery: The novelty of this system lies in its capacity to correlate and compare patterns between these two clusters. When a delta, or significant difference, is detected between these patterns, it is flagged as a potential obfuscation pattern. These obfuscation patterns signify alterations or manipulations in the log files, often indicating an intrusion.

Pattern Display and Utilization: When potential patterns of compromise are identified based on these predetermined deltas, the system makes them available for analysis and action. These patterns are valuable indicators of security breaches, especially when coupled with the context of log tampering.

Integration with IPS/IDS: The system provides these patterns of compromises to Intrusion Prevention Systems (IPS) and Intrusion Detection Systems (IDS), enhancing their capabilities to identify and respond to potential intrusions and threats in real time.

One of the notable characteristics of this system is its ability to work with two entirely distinct types of log data—normal "clean" logs and samples of logs generated during an intrusion. By applying the TF*IDF algorithm to each dataset separately, the system generates clusters of common patterns for both tampered and untampered logs.

What sets this system apart is its capability to identify common obfuscation patterns, despite the significant differences between the two log types. Even when logs originate from different applications and operating systems, the system can link them to a common source of tampering, such as malware or a threat actor. This process is not reliant on traditional signatures or runtime behaviors; instead, it relies on identifying hidden patterns within a multitude of TF-IDF-processed log clusters.

In summary, this system represents a groundbreaking evolution in intrusion detection and threat identification. Its ability to uncover previously invisible patterns makes it a potent tool for cybersecurity, offering a proactive approach to combatting advanced threats. Additionally, its tool-agnostic nature allows for seamless integration into diverse environments, further enhancing its versatility and efficacy in safeguarding critical systems and data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that
uses operating-system-level virtualization. This refers to an
operating system feature in which the kernel allows the
existence of multiple isolated user-space instances, called
containers. These isolated user-space instances typically
behave as real computers from the point of view of programs
running in them. A computer program running on an ordi-
nary operating system can utilize all resources of that
computer, such as connected devices, files and folders,
network shares, CPU power, and quantifiable hardware
capabilities. However, programs running inside a container
can only use the contents of the container and devices
assigned to the container, a feature which is known as
containerization.

PRIVATE CLOUD 106 is similar to public cloud 105,
except that the computing resources are only available for
use by a single enterprise. While private cloud 106 is
depicted as being in communication with WAN 102, in other
embodiments a private cloud may be disconnected from the
internet entirely and only accessible through a local/private
network. A hybrid cloud is a composition of multiple clouds
of different types (for example, private, community or public
cloud types), often respectively implemented by different
vendors. Each of the multiple clouds remains a separate and
discrete entity, but the larger hybrid cloud architecture is
bound together by standardized or proprietary technology
that enables orchestration, management, and/or data/appli-
cation portability between the multiple constituent clouds. In
this embodiment, public cloud 105 and private cloud 106 are
both part of a larger hybrid cloud.

A NETWORKED ENVIRONMENT is shown in FIG. 2.
The networked environment provides an extension of the
information handling system shown in FIG. 1 illustrating
that the methods described herein can be performed on a
wide variety of information handling systems that operate in
a networked environment, depicted by computer network
200. Types of computer networks can include local area
networks (LANs), wide area networks (WANs), the Internet,
peer-to-peer networks, public switched telephone networks
(PSTNs), wireless networks, etc. Types of information han-
dling systems range from small handheld devices, such as
handheld computer/mobile telephone 205 to large main-
frame systems, such as mainframe computer 240. Examples
of handheld computer 205 include smart phones, personal
digital assistants (PDAs), personal entertainment devices,
such as MP3 players, portable televisions, and compact disc
players. Other examples of information handling systems
include pen, or tablet, computer 210, laptop, or notebook,
computer 215, personal computer 220, workstation 230, and
server computer system 235. Other types of information
handling systems that are not individually shown in FIG. 2
can also be interconnected other computer systems via
computer network 200.

Many of the information handling systems include non-
volatile data stores, such as hard drives and/or nonvolatile
memory depicted in FIG. 1. These nonvolatile data stores
and/or memory can be included, or integrated, with a
particular computer system or can be an external storage
device, such as an external hard drive. In addition, remov-
able nonvolatile storage device 245 can be shared among
two or more information handling systems using various
techniques, such as connecting the removable nonvolatile
storage device 245 to a USB port or other connector of the
information handling systems.

An ARTIFICIAL INTELLIGENCE (AI) SYSTEM is
depicted at the bottom of FIG. 2. Artificial intelligence (AI)
system 250 is shown connected to computer network 200 so that it is accessible by other computer systems 205 through
240. AI system 250 runs on one or more information
handling systems (comprising one or more processors and
one or more memories, and potentially any other computing
device elements generally known in the art including buses,
storage devices, communication interfaces, and the like) that
connects AI system 250 to computer network 200. The
network 200 may include multiple computing devices 104 in
communication with each other and with other devices or
components via one or more wired and/or wireless data
communication links, where each communication link may
comprise one or more of wires, routers, switches, transmit-
ters, receivers, or the like. AI system 250 and network 200
may enable functionality, such as question/answer (QA)
generation functionality, for one or more content users.
Other embodiments of AI system 250 may be used with
components, systems, sub-systems, and/or devices other
than those that are depicted herein.

AI system 250 maintains corpus 260, also known as a
"knowledge base," which is a store of information or data
that the AI system draws on to solve problems. This knowl-
edge base includes underlying sets of facts, ground truths,
assumptions, models, derived data, and rules which the AI
system has available in order to solve problems. In one
embodiment, a content creator creates content in corpus 260.
This content may include any file, text, article, or source of
data for use in AI system 250. Content users may access AI
system 250 via a network connection or an Internet connec-
tion to the network 200, and, in one embodiment, may input
questions to AI system 250 that may be answered by the
content in the corpus of data. As further described below,
when a process evaluates a given section of a document for
semantic content, the process can use a variety of conven-
tions to query it from the AI system.

AI system 250 may be configured to receive inputs from
various sources. For example, AI system 250 may receive
input from the network 200, a corpus of electronic docu-
ments or other data, a content creator, content users, and
other possible sources of input. In one embodiment, some or
all of the inputs to AI system 250 may be routed through the
network 200. The various computing devices on the network
200 may include access points for content creators and
content users. Some of the computing devices may include
devices for a database storing the corpus of data. The
network 200 may include local network connections and
remote connections in various embodiments, such that AI
system 250 may operate in environments of any size,
including local and global, e.g., the Internet. Additionally, AI
system 250 serves as a front-end system that can make
available a variety of knowledge extracted from or repre-
sented in documents, network-accessible sources and/or
structured data sources. In this manner, some processes
populate the AI system with the AI system also including
input interfaces to receive knowledge requests and respond
accordingly.

AI Engine 270, such as a pipeline, is an interconnected
and streamlined collection of operations. The Information
works its way into and through a machine learning system,
from data collection to training models. During data collec-
tion, such as data ingestion, data is transported from multiple
sources, such as sources found on the Internet, into a
centralized database stored in corpus 260. The AI system can
then access, analyze, and use the data stored in its corpus.

Models 275 are the result of AI modeling. AI modeling is
the creation, training, and deployment of machine learning
algorithms that emulate logical decision-making based on
the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (UIs) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
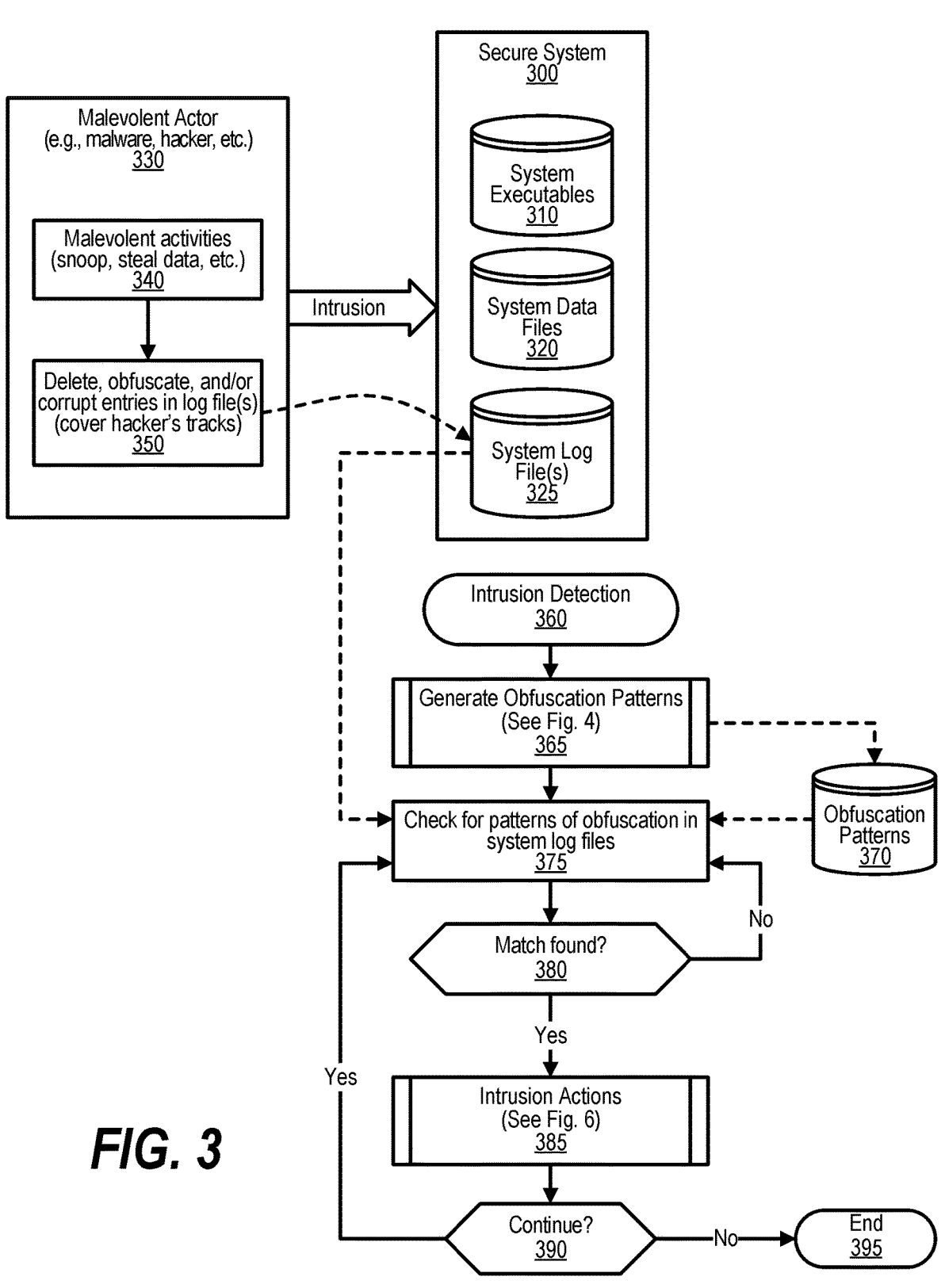
FIG. 3 is a high-level diagram depicting components and steps that identify potential patterns of compromise using system log files.

FIG. 3 is a high-level diagram depicting components and steps that identify potential patterns of compromise using system log files. In FIG. 3, a high-level diagram illustrates the components and processes involved in the identification of potential patterns of compromise using system log files. Within the secure system data (300), three types of data stores play pivotal roles: System Executables Data Store (310), System Data Files Data Store (320), and System Log File(s) Data Store (325). These data repositories hold information related to executable files, data files, and critical system log records.

The diagram introduces the concept of a malevolent actor (330), representing a threat entity such as malware, hackers, or other malicious actors. This malevolent actor engages in a range of nefarious activities 340, including data theft, snooping, and other malicious actions. Notably, the malevolent actor also engages in obfuscation tactics 350 aimed at covering their tracks by tampering with system log files. These obfuscation techniques include deleting entries, editing entries, and corrupting log data.

The process of intrusion detection initiates at step 360, marking the start of the system's efforts to identify any indications of intrusion or unauthorized activities. An important element of this detection process is the execution of the "Generate Obfuscation Patterns Routine" at a predefined step (365). This routine's primary function is to generate patterns associated with log file obfuscation, establishing a foundation for subsequent analysis.

The results of this routine are stored in the "Obfuscation Patterns Data Store" (370), serving as a repository for patterns that can be further analyzed. The process then advances to the examination of system log files to check for patterns of obfuscation (375), actively seeking out signs of tampering or manipulation. If a match indicating log file manipulation is detected, the process proceeds to handle the intrusion using predefined processes (385).

Figure 6:
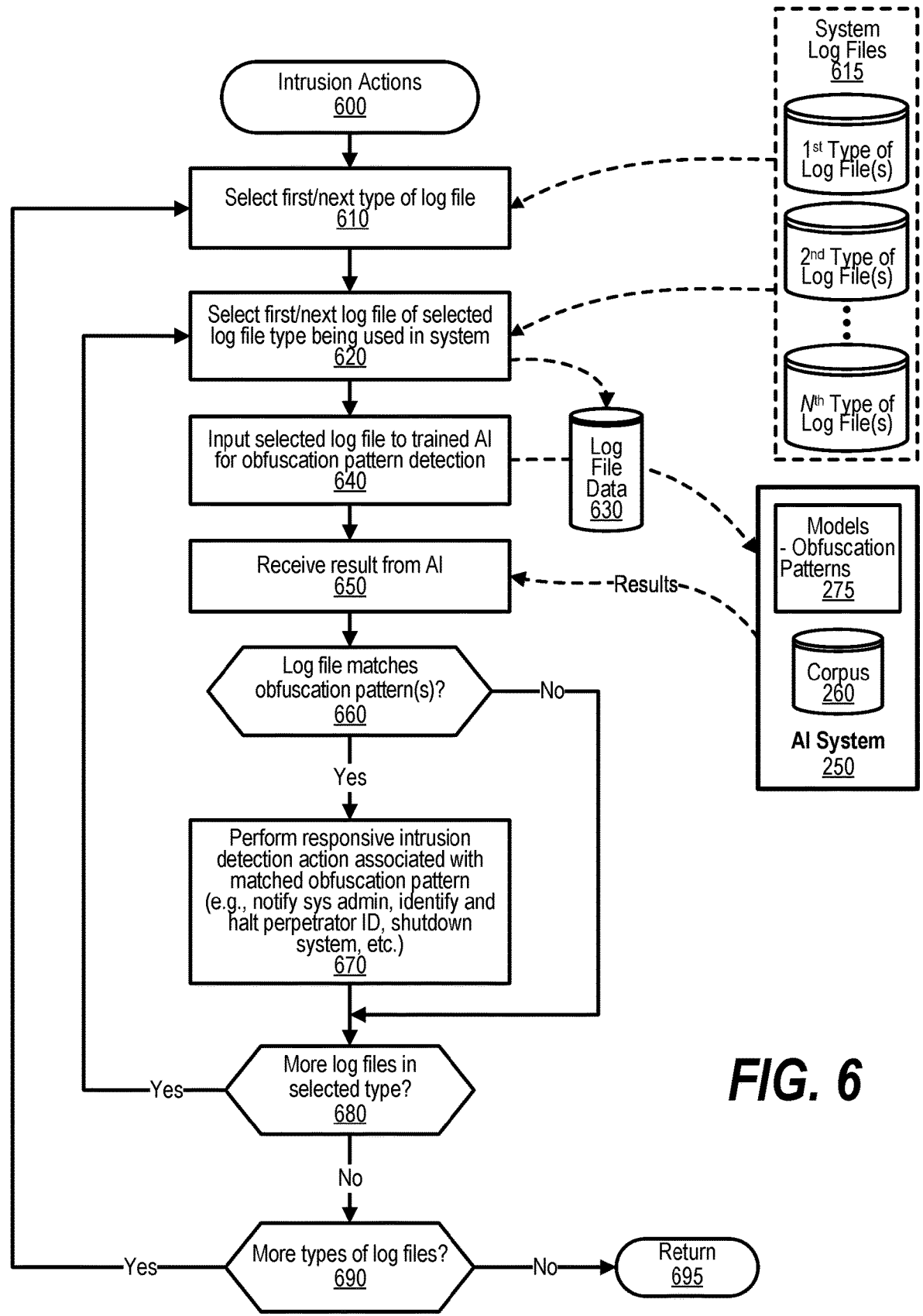
FIG. 6 is a flowchart depicting steps taken to perform intrusion prevention actions when a system intrusion is detected based on a current analysis of system log files.

The handling of the intrusion involves executing a series of predefined actions detailed in FIG. 6 and its corresponding text. Following this, a decision point (390) determines whether further processing is necessary. If additional actions are required, the process loops back to Step 375 to continue the search for obfuscation patterns. This iterative process continues until the intrusion is successfully addressed. The conclusion of processing (395) marks the exit point from the loop, signifying the conclusion of the processing for that specific intrusion instance. In this way, the system actively contributes to the identification and mitigation of potential intrusions by recognizing patterns of obfuscation within system log files, thus enhancing the security of the secure system.

Figure 4:
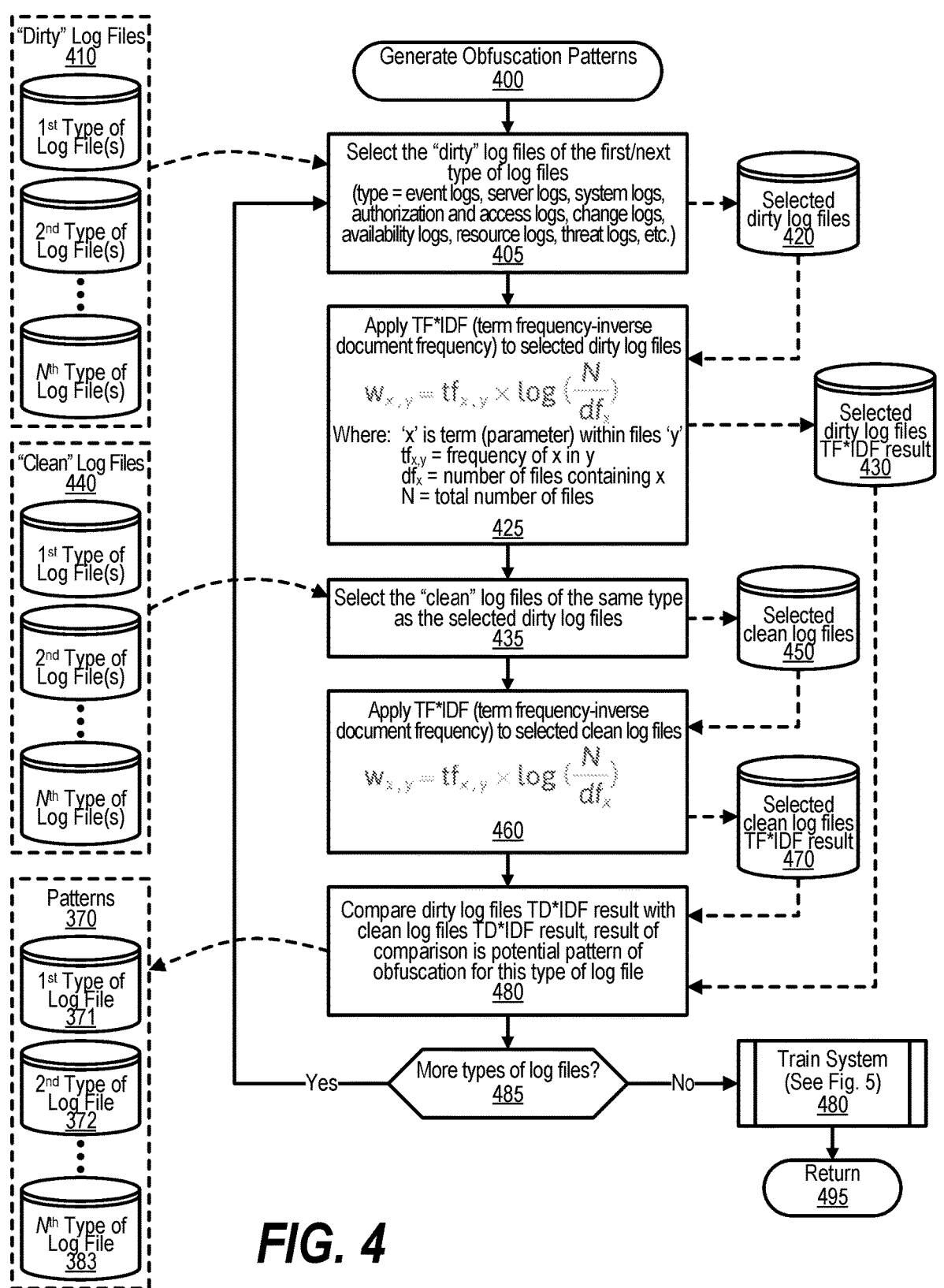
FIG. 4 is a flowchart depicting steps taken to generate obfuscation patterns found in system log files.

FIG. 4 delineates a flowchart illustrating the procedural steps executed for generating obfuscation patterns within system log files. The sequence of operations commences at reference point 400 and elucidates the functionalities performed by an algorithmic process aimed at generating Obfuscation Patterns.

Initially, at step 405, the algorithmic process selects log files, colloquially known as "dirty" log files, from a predetermined set of types. These types encompass event logs, server logs, system logs, authorization and access logs, change logs, availability logs, resource logs, threat logs, and others. These selected "dirty" log files are subsequently fetched from a data repository, denoted as data store 410, and stored in a separate data repository, designated as data store 420.

Subsequently, at step 425, the process invokes the Term Frequency-Inverse Document Frequency (TF*IDF) algorithm upon the selected "dirty" log file, which has been stored in data store 420. The computation is based on the mathematical formulation indicated within reference box 425. Upon completion, the resultant values are stored in a different data repository, referred to as data store 430.

At procedural step 435, the algorithm selects what are termed as "clean" log files. These "clean" log files are of the identical type as the previously selected "dirty" log files. They are extracted from a distinct data repository, labelled as data store 440, and saved into another data repository, identified as data store 450.

In continuation, at step 460, the TF*IDF algorithm is again employed, but this time on the selected "clean" log file that has been stored in data store 450. The results of this computational process are archived in a separate data repository, marked as data store 470.

Following this, at step 480, a comparative analysis is performed between the TFIDF results derived from the "dirty" log files (retrieved from data store 430) and the TFIDF results obtained from the "clean" log files (retrieved from data store 470). The outcome of this comparative analysis yields potential obfuscation patterns pertinent to the type of log file in question. These patterns are then archived in another data repository, designated as patterns data store 370.

A decision point, referred to as decision 485, is then reached to ascertain whether there are additional types of log files requiring processing. If the answer is affirmative, the control flow branches to the 'yes' pathway, looping back to step 405 for the selection and subsequent processing of the next type of log file. This iterative procedure persists until all categories of log files have undergone processing. When no further types of log files remain for processing, the control flow is diverted to the 'no' branch, thereby terminating the loop.

Figure 5:
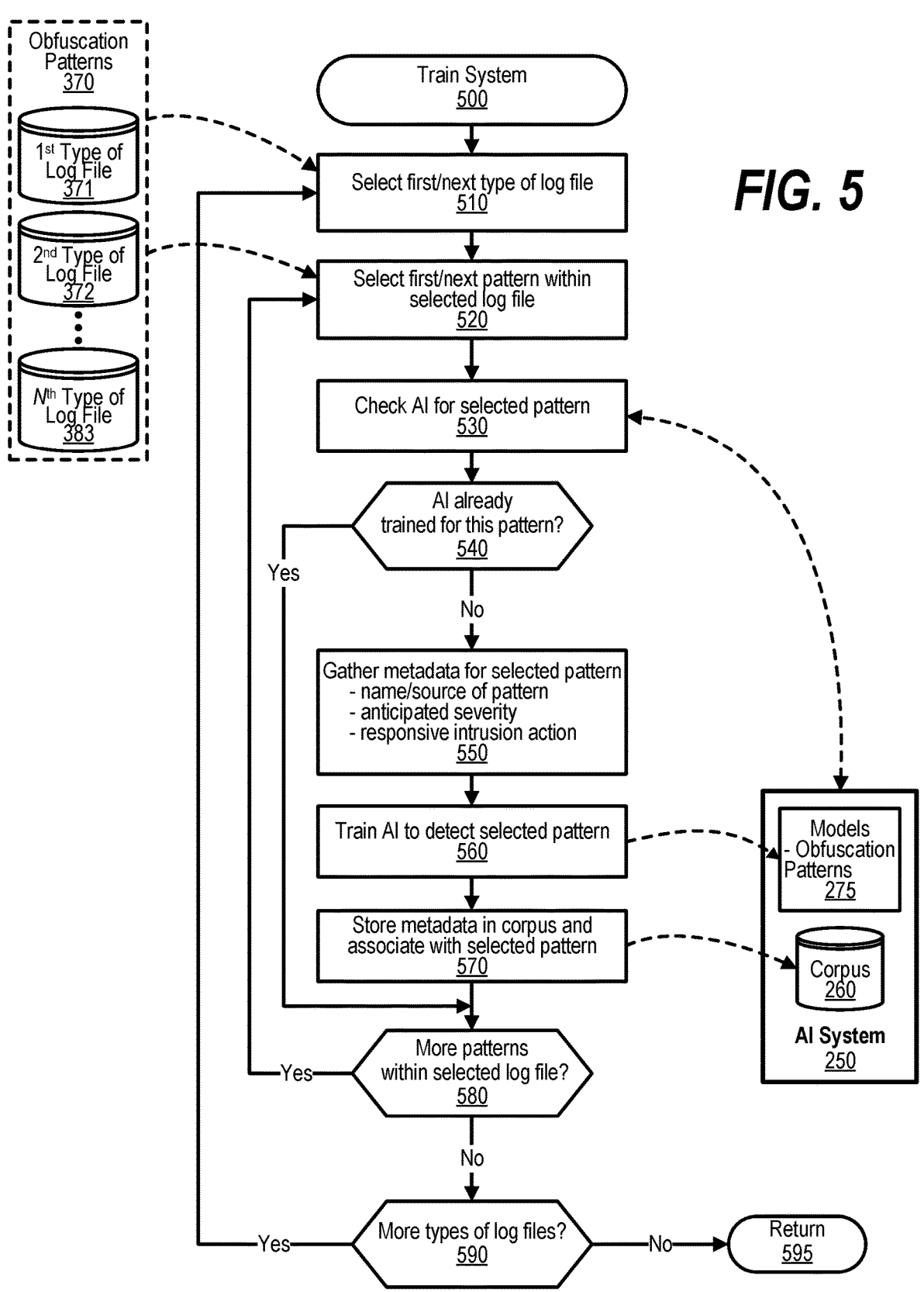
FIG. 5 is a flowchart depicting steps taken to train an artificial intelligence (AI) system to identify potential patterns of compromise using system log files.

At a predefined step, designated as process 480, a training routine, termed as the 'Train System' routine, is invoked (for additional details, consult FIG. 5 and associated textual explanations). This routine undertakes the training of an Artificial Intelligence (AI) model, aiming to proficiently identify diverse patterns of obfuscation within log files. Finally, the operational sequence delineated in FIG. 4 terminates by reverting to the originating subroutine, as depicted in FIG. 3, at reference point 495.

FIG. 5 is a flowchart depicting steps taken to train an artificial intelligence (AI) system to identify potential patterns of compromise using system log files. FIG. 5 delineates an intricate flowchart that encapsulates a series of steps orchestrated by a specialized algorithm designed for the training of the System, commencing at reference point 500.

Initiating the workflow, at step 510, the algorithm chooses the inaugural type of log file, which is sourced from data store 370.

Subsequently, at step 520, the algorithm zeroes in on the first obfuscation pattern found within the chosen log file, also retrieved from data store 370.

Moving forward to step 530, an evaluation is conducted on the existing Artificial Intelligence (AI) model to discern whether it has been previously conditioned to recognize the currently selected obfuscation pattern. This evaluation culminates at a pivotal decision node, identified as decision 540, where the readiness of AI system 250 in identifying this particular pattern is assessed.

Should AI system 250 already possess the requisite training for the pattern under scrutiny, the control sequence veers towards the 'yes' branch, thereby skipping the instructional phases listed as steps 550, 560, and 570.

In contrast, if AI system 250 has not been trained to recognize this specific pattern, the control sequence is rerouted towards the 'no' branch, which entails the execution of steps 550, 560, and 570, designed for the pedagogical enhancement of the AI system.

Particularly, at step 550, metadata related to the selected pattern is amassed. This collection includes elements such as the name and origin of the pattern, the projected severity level of an associated intrusion, and the specified reactive measures to such an intrusion.

Thereafter, at step 560, a customized training session is conducted for AI system 250, aimed at detecting the pattern in focus. The nuances of this training are encapsulated in AI models 275, which constitute an integral component of AI system 250.

Following this, at step 570, the aggregated metadata is stashed in a specialized repository named corpus 260. Additionally, this metadata is systematically linked to the corresponding obfuscation pattern, as illustrated in AI models 275.

A subsequent evaluation phase occurs at decision 580, designed to ascertain whether additional patterns within the selected log file warrant processing. In the affirmative scenario, the control sequence follows the 'yes' branch, cycling back to step 520 for the extraction and analysis of the succeeding pattern. This iterative loop continues until all patterns within the selected log file have been comprehensively addressed, leading to the 'no' branch and the termination of this loop.

Conclusively, at decision 590, a final decision node evaluates the necessity for the processing of additional types of log files. If such a requirement exists, the control sequence loops back to step 510 for the selection of the ensuing type of log file from data store 370. This cycling operation persists until every type of log file has been adequately processed, concluding with the 'no' branch and the cessation of this loop.

The structured methodology depicted in FIG. 5 concludes by rejoining the initial subroutine at reference point 595.

FIG. 6 is a flowchart depicting steps taken to perform intrusion prevention actions when a system intrusion is detected based on a current analysis of system log files. FIG. 6 outlines a sophisticated sequence of operations performed by a specific algorithm aimed at executing responsive actions to an intrusion event. The procedure kicks off at initial reference 600.

The first action, delineated as step 610, involves the algorithm selecting the initial type of system log file from an assortment of current system log files, which are archived in data store 615.

Moving on to step 620, the algorithm identifies the first log file from the aforementioned type currently in use within the computer system for further scrutiny.

At step 640, this chosen log file is then inputted into a trained AI system, referenced as AI system 250, specialized in detecting obfuscation patterns. The system utilizes a tailored AI model of obfuscation patterns, identified as model 275.

Upon analysis, the algorithm receives a response from AI system 250 at step 650. This response conveys whether the scrutinized log file contains any obfuscation patterns that AI system 250 is knowledgeable about.

A decisive fork in the procedural logic occurs at decision node 660, which evaluates whether the log file under consideration aligns with any obfuscation patterns currently catalogued within AI system 250. Should there be a match, the logic flow is directed towards the 'yes' branch, culminating in the execution of step 670.

Conversely, if no pattern match is identified, the flow redirects towards the 'no' branch, effectively bypassing step 670.

Step 670 is significant as it initiates the responsive intrusion detection action that corresponds to the matched obfuscation pattern as identified by AI system 250. These actions can range from sending notifications to system administrators to shutting down the system entirely.

Subsequently, the algorithm consults decision node 680 to assess if there are additional current system log files within the selected log file type that still require processing. In case more files exist, the logic returns to step 620, selecting the next log file for analysis. This loop endures until each file of the selected type has been processed, after which the flow is guided towards the 'no' branch, terminating this loop.

Finally, the algorithm arrives at decision node 690, which gauges whether there are other types of system log files pending analysis. If the condition is met, the sequence is looped back to step 610 to engage with the subsequent type of system log file. This looping continues until all system log file types and individual files have undergone complete examination, at which point the 'no' branch is triggered, thus concluding the loop.

The procedural steps delineated in FIG. 6 ultimately converge back to the originating routine, as specified in FIG. 3, at terminal reference 695.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by a processor coupled to a memory, comprising:

identifying a plurality of first obfuscation patterns, wherein the first obfuscation patterns correspond to tampering of a plurality of entries in a first set of one or more system log files;

wherein the identifying the plurality of first obfuscation patterns comprises:

selecting a plurality of dirty system log files and applying a term frequency-inverse document frequency algorithm to the plurality of dirty system log files resulting in first resultant values stored in a first data store, wherein the dirty system log files have been obfuscated with tampering to a plurality of entries in the dirty system log files;

selecting a plurality of clean system log files and applying a term frequency-inverse document frequency algorithm to the plurality of clean system log files resulting in second resultant values stored in a second data store, wherein the clean system log files are untampered; and comparing the first resultant values of the dirty log files to the second resultant values of the clean log files, the result of the comparing being the plurality of first obfuscation patterns;

monitoring a second set of one or more system log files, wherein the monitoring examines the second set of system log files for any one of the first obfuscation patterns;

detecting, based on the monitoring, a system intrusion when one of the first obfuscation patterns matches a second obfuscation pattern found in one of the second set of system log files; and in response to detecting the system intrusion, performing an action comprising at least one of sending a notification or shutting down a system;

wherein at least one of the system log files is selected from a group consisting of an event log, a server log, a system log, an authorization and access log, a change log, an availability log, a resource log, or a threat log.

2. The method of claim 1 further comprising:

training an artificial intelligence (AI) system with the plurality of first obfuscation patterns;

after the training, inputting a portion of one of the second set of system log files to the trained AI system; and receiving, from the trained AI, an indication whether the portion of one of the second set of system log files matches one of the obfuscation patterns.

3. The method of claim 2 further comprising:

further training the AI system with a set of responsive intrusion actions corresponding to the obfuscation patterns, wherein the receiving includes a selected one of the intrusion actions to take based on the match obfuscation pattern.

4. The method of claim 3 further comprising:

executing the selected intrusion action.

5. An information handling system comprising:

one or more processors;

a memory coupled to at least one of the processors; and a set of instructions stored in the memory and executed by at least one of the processors to perform actions comprising:

identifying a plurality of first obfuscation patterns, wherein the first obfuscation patterns correspond to tampering of a plurality of entries in a first set of one or more system log files;

wherein the identifying the plurality of first obfuscation patterns comprises:

selecting a plurality of dirty system log files and applying a term frequency-inverse document frequency algorithm to the plurality of dirty system log files resulting in first resultant values stored in a first data store, wherein the dirty system log files have been obfuscated with tampering to a plurality of entries in the dirty system log files;

selecting a plurality of clean system log files and applying a term frequency-inverse document frequency algorithm to the plurality of clean system log files resulting in second resultant values stored in a second data store, wherein the clean system log files are untampered; and comparing the first resultant values of the dirty log files to the second resultant values of the clean log files, the result of the comparing being the plurality of first obfuscation patterns;

monitoring a second set of one or more system log files, wherein the monitoring examines the second set of system log files for any one of the first obfuscation patterns;

detecting, based on the monitoring, a system intrusion when one of the first obfuscation patterns matches a second obfuscation pattern found in one of the second set of system log files; and in response to detecting the system intrusion, performing an action comprising at least one of sending a notification or shutting down a system;

wherein at least one of the system log files is selected from a group consisting of an event log, a server log, a system log, an authorization and access log, a change log, an availability log, a resource log, or a threat log.

6. The information handling system of claim 5 wherein the actions further comprise:

training an artificial intelligence (AI) system with the plurality of first obfuscation patterns;

after the training, inputting a portion of one of the second set of system log files to the trained AI system; and receiving, from the trained AI, an indication whether the portion of one of the second set of system log files matches one of the obfuscation patterns.

7. The information handling system of claim 6 wherein the actions further comprise:

further training the AI system with a set of responsive intrusion actions corresponding to the obfuscation patterns, wherein the receiving includes a selected one of the intrusion actions to take based on the match obfuscation pattern.

8. The information handling system of claim 7 wherein the actions further comprise:

executing the selected intrusion action.

9. A computer program product comprising:

a computer readable storage medium comprising a set of computer instructions that, when executed by a processor, are effective to perform actions comprising:

identifying a plurality of first obfuscation patterns, wherein the first obfuscation patterns correspond to tampering of a plurality of entries in a first set of one or more system log files;

wherein the identifying the plurality of first obfuscation patterns comprises:

selecting a plurality of dirty system log files and applying a term frequency-inverse document frequency algorithm to the plurality of dirty system log files resulting in first resultant values stored in a first data store, wherein the dirty system log files have been obfuscated with tampering to a plurality of entries in the dirty system log files;

selecting a plurality of clean system log files and applying a term frequency-inverse document frequency algorithm to the plurality of clean system log files resulting in second resultant values stored in a second data store, wherein the clean system log files are untampered; and comparing the first resultant values of the dirty log files to the second resultant values of the clean log files, the result of the comparing being the plurality of first obfuscation patterns;

monitoring a second set of one or more system log files, wherein the monitoring examines the second set of system log files for any one of the first obfuscation patterns; and detecting, based on the monitoring, a system intrusion when one of the first obfuscation patterns matches a second obfuscation pattern found in one of the second set of system log files; and in response to detecting the system intrusion, performing an action comprising at least one of sending a notification or shutting down a system;

wherein at least one of the system log files is selected from a group consisting of an event log, a server log, a system log, an authorization and access log, a change log, an availability log, a resource log, or a threat log.

10. The computer program product of claim 9 wherein the actions further comprise:

training an artificial intelligence (AI) system with the plurality of first obfuscation patterns;

after the training, inputting a portion of one of the second set of system log files to the trained AI system; and receiving, from the trained AI, an indication whether the portion of one of the second set of system log files matches one of the obfuscation patterns.

11. The computer program product of claim 10 wherein the actions further comprise:

further training the AI system with a set of responsive intrusion actions corresponding to the obfuscation patterns, wherein the receiving includes a selected one of the intrusion actions to take based on the match obfuscation pattern.

12. The computer program product of claim 11 wherein the actions further comprise:

executing the selected intrusion action.

* * * * *